United States Patent [19]

Ohsaki et al.

[11] Patent Number: 4,533,616

[45] Date of Patent: Aug. 6, 1985

[54] DEVELOPER FOR ELECTROPHOTOGRAPHY OF TONER AND MICROENCAPSULATED ADDITIVE

[75] Inventors: Ichiro Ohsaki, Kawasaki; Tetsuo Hasegawa, Tokyo; Koushi Suematsu, Kawasaki, all of Japan

[73] Assignee: Canon Kabushiki Kaisha, Tokyo, Japan

[21] Appl. No.: 497,831

[22] Filed: May 25, 1983

[30] Foreign Application Priority Data

Jun. 1, 1982 [JP] Japan .................................. 57-93569
Jun. 18, 1982 [JP] Japan ................................ 57-105137

[51] Int. Cl.$^3$ ............................................. G03G 9/16
[52] U.S. Cl. ..................................... 430/110; 430/120; 430/138
[58] Field of Search ............... 430/138, 107, 108, 111, 430/114, 110, 137

[56] References Cited

U.S. PATENT DOCUMENTS

| | | | |
|---|---|---|---|
| 2,221,776 | 11/1940 | Carlson | 95/5 |
| 2,297,691 | 10/1942 | Carlson | 95/5 |
| 2,618,522 | 11/1952 | Bowser | 309/14 |
| 2,874,063 | 2/1959 | Greig | 117/17.5 |
| 3,269,626 | 8/1966 | Albrecht | 226/177 |
| 3,666,363 | 6/1972 | Tanaka et al. | 355/17 |
| 4,016,099 | 4/1977 | Wellman et al. | 430/138 |
| 4,071,361 | 1/1978 | Marushima | 96/1.4 |
| 4,254,201 | 3/1981 | Sawai et al. | 430/138 |
| 4,288,517 | 9/1981 | Arimatsu et al. | 430/110 |

*Primary Examiner*—John L. Goodrow
*Attorney, Agent, or Firm*—Fitzpatrick, Cella, Harper & Scinto

[57] ABSTRACT

Excellent durability is obtained by use of a developer for electrophotography containing toner and microcapsule type additive.

13 Claims, No Drawings

DEVELOPER FOR ELECTROPHOTOGRAPHY OF TONER AND MICROENCAPSULATED ADDITIVE

BACKGROUND OF THE INVENTION

1. Field of the Invention

This invention relates to electrophotography in which electrostatic latent images are visualized by charged colored particles and to a developer to be used in electrophotography. More particularly, the present invention relates to microcapsule particles having included colloidal silica therein which can be applied for said developer and to the method for preparation thereof.

2. Description of the Prior Art

In the prior art, there have been known a number of electrophotographic methods as disclosed in U.S. Pat. Nos. 2,297,691, 3,666,363 and 4,071,361. Generally speaking, the electrophotographic method comprises forming electrical latent images on a photosensitive member by utilization of a photoconductive material according to various means, then developing said latent images by use of a toner, optionally transferring the toner image onto a transfer material such as paper, and thereafter fixing the developed image by heating, pressure or solvent vapor to obtain copied products.

There have also been known various methods to visualize the electrical latent image by use of a toner.

For example, a larger number of developing methods have been known, such as the magnetic brush method as disclosed in U.S. Pat. No. 2,874,063, the cascade developing method as disclosed in the U.S. Pat. No. 2,618,522, the powder cloud method and the fur brush method as disclosed in U.S. Pat. No. 2,221,776, the liquid developing method, and others.

The toner image developed is transferred onto a transfer paper such as paper, if desired, and then fixed. As the method for fixing toner images, there have been known the method in which the toner is heated and melted by a heater or a hot roller to be fused and solidified onto the support, the method in which the binder resin in the toner is softened or dissolved by an organic solvent to be fixed onto the support, the method in which the toner is fixed by application of pressure onto the support, and others.

As the toner to be used in these methods, there have been conventionally used fine powders in which dyes or pigments are dispersed in natural or synthetic resins. Further, a third material is added for various purposes. For example, for enhancement of the developing characteristics of a developer, there may be employed flowability improvers such as colloidal silica, alumina, talc powders, etc. or materials capable of controlling charging selected from dyes or pigments as charging controlling agents. During prolonged usage, toners are subjcted to repeated frictions and are excessively charged until they are strongly adsorbed electrostatically onto carriers or the developing sleeve and cannot be peeled off by the developing electrical field, whereby charging of fresh toners may be prevented. For the purpose of releasing a part of the charges on the excessively charged toners, carbon black, fine powders of metals or fine powders of metal oxides may sometimes be added externally, or alternatively a surfactant or a polar solvent is applied by spraying. Otherwise, for preventing film formation of the toner on the photosensitive plate or adhesion of the toner onto carriers or the developing sleeve, it is also common to add externally an abrasive or a lubricant such as teflon powders, cerium oxide, vinylidene fluoride, molybdenum disulfide, etc.

Thus, a variety of substances are added into a developer for various purposes. Presence of these additives has an influence on the performance of a developer and their appropriate additive amounts are to be determined so as to preclude such an influence. However, in some cases, expected performances may not be exhibited due to deterioration or consumption out of the system of the additives during storage or prolonged usage. For example, in case of the liquid developing method, the developer comprises a toner, an inert non-polar liquid medium and a charge controlling agent. In such a developer, the charge controlling agent may sometimes be exhaustively absorbed during storage by the toner, whereby the charge controlling agent must freshly be supplied. Also, in the dry system developing method, colloidal silica which has been made hydrophobic is externally added as flowability improver, frequently and with a very high effect, but colloidol silica may sometimes receive a great shearing force in a developing vessel which causes it to be deteriorated and to make the developing characteristics of a developer instable. On the other hand, in recent years, from the viewpoint of energy saving, no pollution and instantaneous of copying, the method of pressure fixation of toner as proposed in U.S. Pat. No. 3,296,626 is attracting great attention. However, the toner which can be fixed under pressure employs a soft and tacky material, which is very high in agglomerating tendency. Therefore, it is very important to add a flowability improver, but fine particles externally added may be captured into the binder resin of the toner, whereby the fluidity of the toner becomes bad to be disadvantageously short in life. Fresh addition of a flowability improver can restore the original performance. Therefore, it may be considered to make the additive concentration in the toner supplemented higher than that in the developer at the onset of prolonged operations or to supplement the additive into the developer. However, such operations or procedures are cumbersome and therefore, under the present situation, a rigid toner binder resin is used though there are drawbacks such as curling of papers due to high fixing pressure applied, excessive lustre of papers, changes in paper thickness, large weight of fixing devices, and the like.

Colloidal silica, which has been employed in the prior art as a flowability improver, etc. in the developer for electrophotograpy, is a silicate compound bonded through

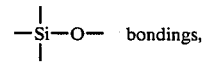

having primary particle diameters of several millimicrons to several hundred millimicrons. It has a very bulky structure and has a very great structural viscosity in a liquid or in a resin. This is also useful in other fields than electrophotography as thickeners of paints, plastics or rubbers. Such a bulky structure can trap a large volume of air, and when colloidal silica is mixed with powders, the air trapped functions as a bearing to make powders which are fluid with low agglomerating tendency. This action is especially great in the so called hydrophobic colloidal silica prepared by alkylation of the silanol groups on the surface of colloidal silica with an alkyl halide. On the other hand, due to its bulky nature, it is very liable to fly up in the air and be difficult to settle down, thus causing troubles both in environmental hygiene and handling.

SUMMARY OF THE INVENTION

An object of the present invention is to provide an electrophotographic method which is excellent in stability of developing performance such as charging characteristic and excellent in durability when it is used repeatedly.

Another object of the present invention is to provide a developer for electrophotography which is stable in developing performance such as charging characteristic and excellent in durability when it is used repeatedly.

Still another object of the present invention is to provide a developer for electrophotography which is excellent in storage stability without deterioration during storage.

Still another object of the present invention is to provide microcapsules having included colloidal silica therein which has overcome the drawbacks as mentioned above and is improved in operability and a method for producing the same.

That is, the present invention provides an electrophotographic method by visualizing an electrostatic latent image by use of a developer containing a toner and an additive, which comprises using an additive of a microcapsule type capable of releasing the additive included within the capsule gradually to be supplemented into the developer during the developing operation, and also a developer comprising a toner and a capsule type additive.

The present invention also provides microcapsule particles of colloidal silica, comprising cores of colloidal silica and walls of a high polymer surrounding said cores, and further a method for preparing microcapsules of colloidal silica, which comprises dispersing colloidal silica into a hydrophobic organic solvent having dissolved any one or any combination of polybasic acid halides, bishalo-formates and polyisocyanates to prepare a slurry-in-liquid, dispersing the slurry-in-liquid into water to form oil droplets therein, permitting any or any combination of polyamines, glycols and polyhydric phehols to be dissolved in water, thereby causing interfacial polymerization to occur at the oil-water interface to form microcapsules of the slurry-in-liquid of colloidal silica, and then removing the hydrophobic organic solvent included therein.

DESCRIPTION OF THE PREFERRED EMBODIMENTS

In the present invention, microcapsules incorporated in a developer, through gradually releasing an included substance participating positively in developing characteristics of a developer such as a flowability improver, a charging controlling agent or an electroconductivizing agent for releasing excessive charging of toner, or a substance participating secondarily in developing characteristics of a developer such as an abrasive or a lubricant, the amounts of these additives are suppressed constantly at certain levels, whereby stabilization of developments is intended simultaneously with elongation of life as well as stability during storage of the developer.

Release of materials included within microcapsules may be effected, in case of a liquid component or in case of a wet system developing method, by diffusion of a liquid through the microcapsule walls, but it is generally effected by destroying of the microcapsule walls by the mechanical force applied on the developer during the developing operation. For destruction of microcapsule walls, there may also be separately provided a stirring device having a high shearing force.

Release of materials included within microcapsules is delayed as the walls of microcapsules are thicker, the degree of hardness of the walls is higher and the particle sizes of microcapsules are smaller, but it is possible to control release of materials included within the microcapsules within a prolonged using period by combination of microcapsules with different release conditions depending on the conditions employed.

As the method for preparation of the microcapsules of the present invention, in case when the material to be included is a liquid, there may be any of various known microencapsulation methods such as by gelatin-gum arabic type complex coacervation, by insitu polymerization of aminoplast type prepolymer, by phase separation with a cellulose type resin, etc. In case when the material to be included is a powder, it is preferred to use the method for the present invention in which the powder is dispersed in a hydrophobic organic solvent in which the powder is insoluble to prepare a slurry-in-liquid, said slurry-in-liquid is dispersed in water to form droplets, followed by interfacial polymerization to form semi-permeable capsule walls, and then the liquid included is extracted out of the microcapsules, followed by drying, to prepare microcapsules comprising the powder and the capsule walls enclosing said powder.

The substance to be included within microcapsules may be suitably, for example, colloidal silica or alumina powders, having primary average particle size preferably of 5 to 100 m$\mu$, as a flowability improver. As the charging controlling agent, there may be employed, for example, an azo type metal containing dye, a metal complex of salicylic acid in the dry developing method, while there are metal soaps, organic phosphorus compounds, organic tin compounds, etc. in the wet developing method. As the conductive agent for releasing a part of charges on the excessively charged toner, there may be used, for example, carbon black, aluminum powders, etc., but it is preferably to use a tin oxide, or zinc oxide type semiconductor of which performance is not influenced by humidity.

One of the specific features of the present invention resides in having colloidal silica included within the microcapsules. Colloidal silica, which will be readily scattered, can be made easily handleable by granulation into sizes some 10 microns to several mm. But, when there is employed such a method as binding with a resin, the bulky property of a colloidal material is lost. Then, while maintaining the bulky property of colloidal silica, coated films comprising a high molecular weight polymer make it easier in handling, and, during usage, the coated films are broken to release the colloidal silica included, thereby permitting the properties inherent in colloidal silica to be exhibited.

The microcapsule particles having included colloidal silica therein may preferably be in the shape of, so to speak, a slurry-in-gas, in which colloidal silica is dispersed in a gas. The microcapsules of such a shape may be considered to be prepared according to the method, in which once a slurry-in-liquid is formed and then semi-permeable films are formed for microencapsulation, followed by replacement of the liquid in the inner portions with a gas.

As the preparation method of such microcapsules, the interfacial polymerization is the most suitable among the known microencapsulation techniques.

In microencapsulation according to interfacial polymerization, monomer A is contained in an organic solvent immiscible with water, conventionally called as oil, and the oil is floating in an aqueous phase. When another monomer B which is water-soluble is added to the aqueous phase, followed by stirring, polymerization occurs at the interface between water and the oil, whereby the film of a polymer is formed only at the interface between water and the oil. The oil is enclosed within the film to give an oil-containing microcapsule. When colloidal silica is dispersed in the oil during this operation, there can be formed a colloidal silica-containing slurry-in-liquid microcapsule.

Monomers A and B are polyfunctional monomers capable of undergoing polycondensation reaction or polyaddition reaction, and one is chosen to be oil soluble, while the other to be water soluble. For example, there are combinations as listed in the following Table 1.

TABLE 1

Exemplary combination of monomers for interfacial polymerization

| (Monomer in aqueous phase) | (Monomer in oil phase) | (Skin film of microcapsule) |
|---|---|---|
| Polyamine | Polybasic acid halide | Polyamide / Polyester |
| Glycol / Polyhydric phenol | Bishalo-formate | Polyurethane |
| | Polyisocyanate | Polyurea / Polyurethane |

As combinations of specific monomers to be used in interfacial polymerization, there may be included:
polybasic acid halides such as adipoyl dichloride, sebacoyl dichloride, terephthaloyl dichloride, isophthloyl dichloride, 1,4-cyclohexanedicarbonyl chloride, 4,4-biphenyldicarbonyl chloride, and the like;
glycols or polyhydric phenols such as resorcin, bisphenol A, 1,5-dihydoxynaphthalene, phenolphthalein, pyrogallol, ethylene glycol, and the like;
polyamines such as ethylenediamine, tetramethylenediamine, hexamethylenediamine, polyethylene imine, piperazine, diethylenetriamine, p-phenylenediamine, and the like;
bishalo-formates such as ethylene bischloroformate, hexamethylene bischloroformate, 2,2'-dimethyl-1,3-propane bischloroformate, p-phenylene bischloroformate, and the like;
polyisocyanates such as toluylene diisocyanate, hexamethylene diisocyanate, triphenylmethane triisocyanate, diphenylmethane diisocyanate and the like.

The capsule film formed is considerably thin, but it is uniform and a typical semi-permeable membrane, and therefore the liquid included therewithin can easily by evaporated by heating after encapsulation, and even a liquid with low volatility may be replaced with a highly volatile solvent such as methanol to be easily dried. The residual reaction reagent can also easily be removed with the use of alcohols, etc. to give microcapsules containing substantially colloidal silica and air therein.

The coated films of the thus prepared colloidal silica containing microcapsules are not broken or scattered by usual operation, but by application of a high shearing force, the coated films of the microcapsules are broken to release the colloidal silica included therein with the same bulk density as the original colloidal silica before microencapsulation.

The microcapsules including the additive of the present invention may be preferably previously mixed with toner before use in a weight ratio of the additive to be included of 0.05 to 10% by weight based on the toner in the developer. If desired, it may be also externally added afterwards suitably into the developer. Even in this case, as different from the case in which the additive is used as powder or liquid, the handling is easier without scattering of powders or wetting of the device with liquid.

The toner particles to be used in the present invention are constituted of a colorant, a binder resin, etc. As the binder resin, there may be used all of those known in the art, as exemplified by homopolymers of styrene or derivatives thereof such as polystyrene, poly-p-chlorostyrene, polyvinyltoluene and the like, styrene type copolymers such as styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinylmethyl ether copolymer, styrenevinylethyl ether copolymer, styrenevinyl methyl ketone copolymer, styrene-butadiene copolymer, styrene isoprene copolymer, styrene-acrylonitrile-indene copolymer, styrene maleic acid copolymer, styrene-maleic acid ester copolymer and the like, polymethyl methacrylate, polybutyl methacrylate, polyvinyl chloride, polyvinyl acetate, polyethylene, polypropylene, polyester, polyurethane, polyamide, epoxy resin, polyvinyl butyral, polyacrylic resin, rosin, modified resin, terpene resin, phenolic resin, aliphatic or alicyclic hydrocarbon resin, aromatic petroleum resin, chlorinated paraffin, praffin wax, and so on. These may be employed either singly or as mixtures. Further, in the toner, there may also be used various kinds of dyes or pigments such as carbon black for the purpose of coloration, or control of charging, etc. It is also possible to use the toner as a one-component magnetic toner by incorporating magnetic powders therein.

EXAMPLE 1

| Colloidal silica Aerosil R-972 (produced by Nippon Aerosil Co.) | 30 wt. parts |
|---|---|
| Toluene | 100 " |
| Terephthalic acid dichloride | 1.6 " |

A mixture comprising the above components was dispersed under stirring into an aqueous solution shown below to form oil droplets of 100 to 10μ in size. Then, 20 ml of an aeuqous 10% hexamethylenediamine solution was added dropwise, and the mixture was continued to be stirred for 4 hours. After completion of the reaction, the slurry was filtered, washed with water to wash the residual polyvinyl alcohol, and finally washed with methanol, followed by drying to obtain solid powders of microcapsules having included colloidal silica therein.

| Polyvinyl alcohol | 30 wt. parts |
|---|---|
| Water | 1000 " |
| Sodium hydrogen carbonate | 5 " |

EXAMPLE 2

| Polyethylene wax | 50 wt. parts |
|---|---|
| Charging controlling agent | 2 " |
| Magnetic material | 50 " |

The above mixture was kneaded on a roll mill heated to 130° C., crushed after cooling and classified by a zig-zag classifier to obtain toners with an average particle size of 10μ.

Next, 1.2 wt. parts of the microcapsules of Example 1 were mixed with 100 parts of the above toners to obtain a developer.

The toner was placed in an electrophotographic copying machine (produced by Canon K.K., trade name: NP-120, fixing pressure: 25 Kg/cm) and copying durability test was conducted. As the result, the maximum image density was found to fall within 1.2±0.2 from the initial stage up to 100,000 sheets of copying and the image obtained were clear.

COMPARATIVE EXAMPLE 1

Example 2 was repeated except that fine powders of colloidal silica which were not microencapsulated were employed in place of the microcapsules including colloidal silica. As the result, although the maximum image density at the initial stage exceeded 1.5, but it is gradually lowered as the progress of the durability test, until it become lower than 0.5 on copying of 10,000 sheets, simultaneously with appearance of portions carrying no toner on the developing sleeve due to agglomeration of the toners.

EXAMPLE 3

After the durability test of 10,000 sheets in Comparative example 1, the microcapsules including colloidal silica prepared in Example 1 were sprayed in a weight ratio of 1.2 wt. parts, and further 100 sheets of copying were conducted, whereby the portions carrying no toner on the developing sleeve disappeared and the maximum image density was restored to 1.0. Then, on copying 600 sheets, the maximum image density became 1.2, which value was maintained within 1.2±0.2 up to 100,000 sheets, and the images obtained were also clear.

EXAMPLE 4

Twenty grams (20 g) of gelatin having an isoelectric point of 8 were dispersed well in 160 g of cold water, followed by temperature elevation up to 50° C., to be completely dissolved therein. In this aqueous gelatin solution was floated 120 g of 10% solution of a polyaminopolybutenyl succinimide (trade name: OLOA 1,200, produced by Calonite Kagaku Co., charing controlling agent for wet system development) in Isoper H under stirring by means of a homomixer (produced by Tokushu Kika Kogyo, Co.) for 30 minutes, to obtain an emulsion of 30 to 100 μ. Then, 20 g of gum arabic was dissolved in 160 g of water in the same manner as gelatin, and the resultant solution was mixed into the above emulsion under stirring, followed by dropwise addition of an aqueous 20% NaOH solution to adjust the pH value of the system to 10. 500 g of warm water of 50° C. was added to this mixture and the mixture was stirred for 30 minutes, and then an aqueous 20% sulfuric acid solution was added gradually dropwise thereinto to lower the pH value of the system to 4.4.

The gelatin-gum arabic composite layer was precipitated through phase separation around the liquid droplets of the polyaminopolybutenyl succinimide-Isopar solution. The temperature was lowered within 30 minutes to 5° C. until the gelatin-gum arabic composite layer was gelled, whereupon 3.8 g of an aqueous 37% formalin solution was added and the mixture was stirred at the same temperature for 30 minutes, followed by temperature elevation up to 50° C. and stirring was continued for additional 2 hours to harden the gelatin-gum arabic composite layer. The microcapsules obtained were subjected to filtration and washing with water, repeatedly, followed by drying to obtain solid powders of gelatin-gum arabic composite microcapsules including polyaminopolybutenyl succinimide-Isopar solution.

EXAMPLE 5

| Super Bekkasite 1126 (rosin-modified phenol) | 50 wt. parts |
|---|---|
| AC polyethylene #6 (low M.W. polyethylene) | 50 " |
| Regal 400 R (carbon black) | 15 " |
| Isoper H | 250 ml |

The above materials were mixed and heated, and after confirming that the mixture was completely homogeneously dispersed into a state like a solution, it was mixed with 500 ml of separately cooled Isopart H to be minutely dispersed therein, followed further by dispersing of the dispersion by means of a ball mill for 24 hours. Then, 500 ml of Isopar was further added to the dispersion to prepare a conc. toner.

To one liter of the above conc. toner was added 10 ml of a polyaminopolybutenyl succinimide-Isopar solution, followed by addition of 20 gr of the gelatingum arabic composite microcapsules including the polyaminopolybutenyl succinimide-Isopar solution as prepared in Example 4, to provide a supplemental liquid. The supplemental liquid (200 ml) was diluted with 2 liters of Isopar to give a developing liquid. When this developing liquid was applied in a liquid developing type transfer copying machine NP-6 (produced by Canon K.K.), whereby very clear images were obtained with high density (Dmax=1.2). When a developing liquid was prepared from the above supplemental liquid after storage at 50° C. for one month and image formation was effected similarly as above, the image density and the image quality were found to be maintained as good as in case of the fresh developing liquid.

COMPARATIVE EXAMPLE 2

From the conc. toner prepared in the same manner as in Example 5, there were prepared a supplemental liquid and a developing liquid according to the same procedure as in Example 5 except that no gelatin-gum arabic composite microcapsules including the polyaminopolybutenyl succinimide-Isopar solution as prepared in Example 4 was added. When this developing liquid was applied for NP-6, very clear image could be obtained with high density (Dmax=1.2). When a developing liquid was prepared from the supplemental liquid after storage at 50° C. for one mnoth and image formation was effected by NP-6, the image density was no higher than 0.5, and the original performance was exhibited only after addition of 0.5 ml of polyaminopolybutenyl succinimide-Isopar solution per one liter of the developing liquid. For compensating previously the deterioration of the supplemental liquid, it is required to add 30 ml or more of polyaminopolybutenyl succinimide-Isopar solution into the supplemental liquid. Within such a region, where an excessive amount of charging controlling agent exists, images were blurred to give only inferior images.

EXAMPLE 6

Example 1 was repeated except that 20 wt. parts of electroconductive tin oxide were used in place of 30 parts of colloidal silica and toluene was changed to 40 wt. parts, to obtain microcapsules including electroconductive tin oxide with particle size of 10 to 100 μ.

EXAMPLE 7

| | |
|---|---|
| Styrene-dimethylaminoethyl methacrylate copolymer | 20 wt. parts |
| Styrene-butadiene copolymer | 80 " |
| Carbon black | 3 " |

The above materials were kneaded by heating on a roll mill, and crushed after cooling to obtain toners with particle size of 20 μ or less. To 1 Kg of the toners was added 20 gr of the microcapsules including electroconductive tin oxide as prepared in Example 6 to prepare a supplemental developer. To 100 gr of this supplemental developer was added 900 gr of iron oxide powders, followed by mixing to prepare a starting developer. The developer was applied to NP-8500 (produced by Canon K.K.) and image formation was effected continuously for 100,000 sheets, while supplying the above supplemental developer, whereby the image obtained maintained the same high image density (Dmax=1.1) and an image quality as good as at the initial stage. This result is not changed even under a very low humidity environment of 5% RH at 15° C.

COMPARATIVE EXAMPLE 3

When image formation was performed in the same manner as in Example 7 except that no microcapsule including electroconductive tin oxide was added to the toner as prepared in Example 7, the image density was lowered very little at normal temperature and normal humidity, but it was lowered to 0.5 or less at a very low humidity of 5% RH at 15° C. after 10,000 to 20,000 sheets of copying to give images with a remarkable edge effect.

Then, the electroconductive tin oxide was added to the developer in an amount of 1 wt. % based on the toner, the image density was restored to 1.0 and the edges were not so conspicuous. Under the same conditions, when 1 wt. % of the electroconductive tin oxide was added to the toner on initiation of the durability test and the same toner was supplemented during the durability test, the image density became lowered after 30,000 to 40,000 sheets of copying. Under the same conditions, when the amount of the electroconductive tin oxide added externally was increased to 4 wt. %, the image density at the initial stage was as low as 0.7, but reached 0.9 after 8,000 to 10,000 sheets of copying, which value was substantially maintained thereafter.

This result is given in the following Table, together with that of Example 7 for comparative purpose.

TABLE 2

| | Image density changes at low temperature (15° C., 5% RH) | | | | |
|---|---|---|---|---|---|
| | Image density | | | | |
| | At start-up | 5,000 sheets | 10,000 sheets | 50,000 sheets | 100,000 sheets |
| Example 7 (Conductive tin oxide about 2 wt. %) | 1.05 | 1.20 | 1.15 | 1.15 | 1.10 |
| Comparative example (No tin oxide) | 1.15 | 0.80 | 0.60 | 0.50 | — |
| Comparative example (Tin oxide 1 wt. %) | 1.00 | 0.95 | 0.90 | 0.55 | — |
| Comparative example (Tin oxide 4 wt. %) | 0.70 | 0.75 | 0.90 | 0.95 | 0.90 |

EXAMPLE 8

| | |
|---|---|
| Colloidal silica Aerosil R-972 (produced by Nippon Aerosil Co.) | 30 wt. parts |
| Toluene | 100 " |
| Terephthalic acid dichloride | 5 " |

A mixture comprising the above components was dispersed under stirring into an aqueous solution shown below:

| | |
|---|---|
| Polyvinyl alcohol | 10 wt. parts |
| Water | 1000 " |
| Sodium hydrogen carbonate | 15 " | to form oil droplets of 500μ to 50μ in size. Then, 60 ml of an aqueous 10% hexamethylenediamine solution was added dropwise, and the mixture was continued to be stirred for 4 hours. After completion of the reaction, the slurry was filtered, washed with water to wash the residual polyvinyl alcohol, and finally washed with methanol, followed by drying to obtain solid powders of microcapsules having polyamide walls with sizes of 500 to 50μ, having included colloidal silica therein. When the powders were crushed by means of a Henschel mixer (produced by Mitsui Miike Kogyosho), they released air-floating colloidal silica with a high bulk density.

EXAMPLE 9

| | |
|---|---|
| Colloidal silica (trade name: Talanox | 30 wt. parts |

| | |
|---|---|
| T-500, produced by Talco Co.) | |
| Methylene chloride | 100 " |
| Terephthalic acid dichloride | 2 " |

A mixture comprising the above components was dispersed under stirring into an aqueous solution shown below:

| | |
|---|---|
| Sodium alkylbenzene sulfonate | 5 wt. parts |
| Water | 1000 " |
| Sodium hydrogen carbonate | 15 " | to form oil droplets of 300μ to 20μ in size. Then, 200 ml of an aqueous 10% ethylene glycol solution was added dropwise, and the mixture was continued to be stirred for 20 minutes. After completion of the reaction, the slurry was filtered, washed with water and then with ether, and dried to obtain solid powders of microcapsules having polyester walls with sizes of 300 to 20μ, having included colloidal silica therein. When the powders were crushed by means of a Henschel mixer (produced by Mitsui Miike Kogyosho), they released air-floating colloidal silica with a high bulk density.

EXAMPLE 10

| | |
|---|---|
| Colloidal silica Aerosil R-972 (produced by Nippon Aerosil Co.) | 30 wt. parts |
| Benzene | 100 " |
| Hexmethylene bischloroformate | 3 " |

A mixture comprising the above components was dispersed under stirring into an aqueous solution shown below:

| | |
|---|---|
| Carboxymethyl cellulose | 10 wt. parts |
| Water | 1000 " |
| Sodium hydrogen carbonate | 15 " | to form oil droplets of 100μ to 10μ in size. Then, 60 ml of an aqueous 10% hexamethylenediamine solution was added dropwise, and the mixture was continued to be stirred for 5 hours, while maintaining the temperature at about 40° C. After completion of the reaction, the slurry was filtered, washed with water to wash the residual carboxymethyl callulose, and finally washed with methanol, followed by drying to obtain solid powders of microcapsules having polyurethane walls with sizes of 100 to 10μ, having included colloidal silica therein. When the powders were crushed by means of a Henschel mixer (produced by Mitsui Miike Kogyosho), they released air-floating colloidal silica with a high bulk density.

EXAMPLE 11

| | |
|---|---|
| Colloidal silica Aerosil R-972 (produced by Nippon Aerosil Co.) | 30 wt. parts |
| Toluene | 100 " |
| Toluylene diisocyanate | 5 " |

A mixture comprising the above components was dispersed under stirring into an aqueous solution shown below:

| | |
|---|---|
| Methyl cellulose | 10 wt. parts |
| Water | 1000 " | to form oil droplets of 300μ to 100μ in size. Then, 50 ml of an aqueous 10% tetramethylenediamine solution was added dropwise, and the mixture was continued to be stirred for 3 hours. After completion of the reaction, the slurry was filtered, washed with water to wash the residual methyl cellulose, and finally washed with ether, followed by drying to obtain solid powders of microcapsules having polyurea walls with sizes of 300 to 100μ, having included colloidal silica therein. When the powders were crushed by means of a Henschel mixer (produced by Mitsui Miike Kogyosho), they released air-floating colloidal silica with a high bulk density.

As described above, by microencapsulation of colloidal silica, the air-floating colloidal silica can be changed to settling colloidal silica particles, whereby handling of colloidal silica has been improved to a great extent.

As the method for using the microcapsules containing colloidal silica, they may be dispersed in a liquid to give a liquid which is usually not viscous, but has a large structural viscosity on rupture of microcapsules by stirring. It is also possible to use advantageously these microcapsules by mixing into a developer used in electrophotography, electrostatic printing or magnetic printing so as to release colloidal silica as a flowability improver.

What we claim is:

1. A developer for electrophotography which comprises a toner and a microencapsulated additive capable of gradual release into said developer during electrophotographic development by destruction of the microcapsule wall, said additive enhancing development of an electrostatic image and comprising a flowability improver, a charge control agent, an electroconductivizing agent, an abrasive or a lubricant.

2. A developer for electrophotography according to claim 1, wherein said microencapsulated additive is a microcapsule particle of colloidal silica having a core of colloidal silica and a wall of a high polymer surrounding said core.

3. A developer for electrophotography according to claim 1, wherein said microencapsulated additive is a microcapsule particle obtained by dispersing colloidal silica into a hydrophobic organic solvent having dissolved any one or any combination of polybasic acid halides, bishalo-formates and polyisocyanates to prepare a slurry-in-liquid, dispersing the slurry-in-liquid into water to form oil droplets therein, permitting any or any combination of polyamines, glycols and polyhydric phenols to be dissolved in water, thereby causing interfacial polymerization to occur at the oil-water interface to form microcapsules of the slurry-in-liquid of colloidal silica, and then removing the hydrophobic organic solvent included therein.

4. A developer for electrophotography according to claim 1, wherein said microencapsulated additive is added in an amount of 0.05 to 10 wt. % based on the toner.

5. A developer for electrophotography according to claim 2, wherein said colloidal silica has an average primary particle size of 5 to 100 mμ.

6. An electrophotographic method for visualizing an electrostatic latent image by use of a developer containing a toner and an additive, which comprises using a microencapsulated additive capable of gradual release into the developer during the developing operation, said additive comprising a flowability improver, a charge controlling agent, an electroconductivizing agent, an abrasive or a lubricant.

7. An electrophotographic method according to claim 6, wherein said microencapsulated additive includes a flowability improver therein.

8. An electrophotographic method according to claim 6, wherein said microencapsulated additive is a microcapsule particle of colloidal silica having a core of colloidal silica and a wall of a high polymer surrounding said core.

9. An electrophotographic method according to claim 6, wherein said microencapsulated additive is a microcapsule particle obtained by dispersing colloidal silica into a hydrophobic organic solvent having dissolved any one or any combination of polybasic acid halides, bishalo-formates and polyisocyanates to prepare a slurry-in-liquid, dispersing the slurry-in-liquid into water to form oil droplets therein, permitting any or any combination of polyamines, glycols and polyhydric phenols to be dissolved in water, thereby causing interfacial polymerization to occur at the oil-water interface to form microcapsules of the slurry-in-liquid of colloidal silica, and then removing the hydrophobic organic solvent included therein.

10. An electrophotographic method according to claim 6, wherein said microencapsulated additive is added in an amount of 0.05 to 10 wt. % based on the toner.

11. An electrophotographic method according to claim 6, wherein said microencapsulated additive includes a charging controlling agent therein.

12. An electrophotographic method according to claim 6, wherein said microencapsulated additive includes an electroconductivizing agent.

13. An electrophotographic method according to claim 8, wherein said colloidal silica has an average primary particle size of 5 to 100 m$\mu$.

* * * * *